(12) United States Patent
Veldhuizen

(10) Patent No.: US 9,177,026 B2
(45) Date of Patent: Nov. 3, 2015

(54) LEAPFROG TREE-JOIN

(71) Applicant: LogicBlox, Inc., Atlanta, GA (US)

(72) Inventor: Todd L. Veldhuizen, Waterloo (CA)

(73) Assignee: LogicBlox, Inc., Atlanta, GA (US)

( * ) Notice: Subject to any disclaimer, the term of this patent is extended or adjusted under 35 U.S.C. 154(b) by 244 days.

(21) Appl. No.: 14/018,930

(22) Filed: Sep. 5, 2013

(65) Prior Publication Data

US 2014/0089292 A1 Mar. 27, 2014

Related U.S. Application Data (60) Provisional application No. 61/706,484, filed on Sep. 27, 2012.

(51) Int. Cl.
*G06F 17/30* (2006.01)

(52) U.S. Cl.
CPC ................................ *G06F 17/30466* (2013.01)

(58) Field of Classification Search
None
See application file for complete search history.

(56) References Cited

U.S. PATENT DOCUMENTS

| | | | |
|---|---|---|---|
| 6,138,111 A | 10/2000 | Krishna | |
| 6,397,204 B1 | 5/2002 | Liu et al. | |
| 6,493,701 B2 | 12/2002 | Ponnekanti | |
| 7,092,954 B1 | 8/2006 | Ramesh | |
| 7,512,600 B2 | 3/2009 | Al-Omari et al. | |
| 7,617,179 B2 | 11/2009 | Nica | |
| 7,693,821 B2* | 4/2010 | Hill et al. | 707/999.002 |
| 7,949,655 B2 | 5/2011 | Milby | |
| 8,145,627 B2 | 3/2012 | Al-Omari | |
| 2006/0136380 A1 | 6/2006 | Purcell | |
| 2008/0288444 A1 | 11/2008 | Edwards et al. | |
| 2012/0047117 A1* | 2/2012 | Nica | 707/702 |

OTHER PUBLICATIONS

International Search Report of International Application No. PCT/US2013/061281; International Filing Date: Sep. 24, 2013; Date of Mailing: Jan. 28, 2014; 5 pages.
Bruce Momjian, "PostgreSQL: Introduction and Concentps," Jun. 17, 2000, 490 pages.
IBM Corporation, "Indexes that accelerate join operations," Software Information Center for IBM Red Brick Warehouse 6.3, Mar. 2004, 48 pages.

(Continued)

*Primary Examiner* — Rehana Perveen
*Assistant Examiner* — Raheem Hoffler
(74) *Attorney, Agent, or Firm* — Cantor Colburn LLP (57) ABSTRACT

A method for joining records from database tables is proposed. Join attributes are ordered into a sequence $S_0$, and a scope C is initialized to empty. Tables including a join attribute A that is first in $S_0$ are identified. A new sequence S' omits A from $S_0$. Iteration through each identified table proceeds in join attribute A order. The iteration utilizes a tree index structure for each identified table where the index key includes all join attributes in the identified table in $S_0$ order. For each matched value v of the join attribute located during the iterating, a new scope $C_v$ is created by appending "A=v" to the scope C. If S' is empty, a tuple corresponding to the scope $C_v$ is output. Otherwise, $S_0$ is set to S' and for each scope $C_v$, C is set to $C_v$ and the steps beginning with the identifying step are recursively invoked.

22 Claims, 2 Drawing Sheets

(56) References Cited

OTHER PUBLICATIONS

Microsoft Developer Network, "Join Conditions for Tables, Queries, and Views," MSDN Library for Visual Studio 2005, 2005, 7 pages.
Written Opinion of the International Searching Authority for International Application No. PCT/US2013/061281; International Filing date: Sep. 24, 2013; Date of Mailing: Jan. 28, 2014; 7 pages.
Patrick Valduriez, "Join Indices," Microeletronics and Computer Technology Corporation, ACM Transactions on Database Systems, vol. 12, No. 2, Jun. 1987, pp. 218-246.
Blanas et al., "A Comparison of Join Algorithms for Log Processing in MapReduce," 2010, 12 pages.
Ngo et al., "Towards Instance Optimal Join Algorithms for Data in Indexes," Feb. 2012, http://arxiv.org/pdf/1302.0914.pdf, 43 pages.

* cited by examiner

LEAPFROG TREE-JOIN

CROSS-REFERENCE TO RELATED APPLICATION

This application claims the benefit of U.S. Provisional Application No. 61/706,484, filed Sep. 27, 2012, and entitled "Leapfrog Tree-Join", the content of which is incorporated herein by reference in its entirety.

BACKGROUND

The present invention relates generally to database operations, and, more specifically, to join operations on relational database tables.

Database management systems make it possible for users to store and update large collections of information, while also supporting queries over that information. Combining data from several tables is a fundamental operation used by relational database management systems when performing database queries. In a join operation, one or more conditions specify how rows in each participating table should be related in order to generate a query result. Though the output of a join operation may be further processed to generate a query result, the cost of the join operation(s) is typically dominant in terms of both time and space. Several algorithms have been proposed for implementing joins including sort-merge join, nested-loop join, index-nested-loop join, and hash join. These algorithms are typically used to join two tables at a time, with more complex join queries broken down into a sequence of pairwise joins.

SUMMARY

Embodiments include a method, system, and computer program product for joining records from a set of tables in a database according to a set of join conditions on a set S of join attributes. An aspect includes arranging the join attributes S into an ordered sequence $S_0$, and initializing a scope C to empty. An aspect includes identifying tables in the set of database tables that include a join attribute A that is first in the ordered sequence $S_0$. An aspect includes creating a new sequence S' of join attributes that omits the join attribute A from $S_0$. An aspect also includes iterating through each of the identified tables in join attribute A order. The iterating based on a tree index structure for each of the identified tables where the index key includes all join attributes in the identified table in $S_0$ order. An aspect also includes, for each matched value v of the join attribute located during the iterating, creating a new scope $C_v$ by appending "A=v" to the scope C. An aspect further includes determining whether S' is empty, and based on determining that S' is empty, outputting a tuple corresponding to the scope C. An aspect further includes, based on determining that S' is not empty, setting $S_0$ to S' and for each scope $C_v$, setting C to $C_v$ and recursively invoking the identifying, creating, iterating, adding, and determining.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features and advantages of the invention are apparent from the following detailed description taken in conjunction with the accompanying drawings in which:

DETAILED DESCRIPTION

Exemplary embodiments relate to a novel technique, referred to herein as a "leapfrog tree-join", for computing a join of multiple database tables at once. The leapfrog tree-join performs a simultaneous equijoin on any number of tables that share attributes. Embodiments described herein achieve a better complexity bound (e.g., may require fewer steps as the input gets larger) than combinations of pairwise join operations.

A merge-join algorithm may be performed as follows. As a starting assumption, a set of tables $R_1, R_2, \ldots, R_r$ that all contain an attribute v may be considered, where the tables are physically sorted in increasing v order. The merge-join of the tables on attribute v is obtained by scanning through each table using a cursor. The table R with the smallest v value at its cursor $C_r$ has $C_r$ advanced until the value at $C_r$ is at least the largest value of v at any cursor. When all tables agree on a single v value, output records are generated by combining v with the other attribute values from each table that are needed in the query. In a traditional merge-join, the presence of multiple records with a value v in a table may lead to multiple output records for a single v value.

It may be further assumed that, in addition to being sorted by v, each table above has a tree index on v. In an embodiment, a B-tree structure is used, however alternative tree structures such as, but not limited to, tries may also be used. In the case where a tree index is used, the merge-join can be implemented more efficiently because not every v value needs to be scanned. For example, it may be assumed that table $R_1$ has records with keys $\{1, 2, 3, \ldots, 1000\}$, and that $R_2$ has keys $\{1,750\}$. Then, after the algorithm passes v=1, the largest value at any cursor is v=750. Rather than scanning $R_1$ linearly until v=750 is reached, the system can seek for 750 in the index on v in $R_1$. The worst case complexity to finding the next item drops from linear to logarithmic in the table size. The total cost of m seeks for an increasing sequence of keys in a table of size n has complexity O(m log(n/m)) using a straightforward tree traversal technique.

As described herein, a variant of merge-join, referred to as a cursor-join, may be used by embodiments. A cursor-join utilizes tree indexes as described above, and takes as input a tuple, SC, of attribute values corresponding to the "scope" of the join. The scope specifies certain attribute values from the participating tables, and only records matching those values participate in the join.

A cursor for each input relation that possesses the join attribute is determined by finding the first row in the table that matches SC on the attributes mentioned in SC. Given suitable indexes on each input table, these cursor positions can be found efficiently. The join terminates as soon as one of the cursors points to an input record that has an attribute whose value is outside the scope (i.e., different from the corresponding attribute's value in SC). A cursor-join behaves like a merge-join, except for how it generates its output. When a cursor-join encounters a new value, v, for the join attribute for which all participating tables have at least one matching record, it outputs a new scope equal to SC∪{A=v}, where A is the join attribute. Even if v occurs in many records of a participating table, only one scope instance containing v is output.

In some embodiments, a leapfrog tree-join performs a simultaneous equijoin on any number of tables $R_1, R_2, \ldots, R_r$ that share attributes in any fashion. For example, the query Q=R(A,B),S(B,C),T(A,C) has three join attributes A, B, and C. In general, let $A_1, \ldots, A_k$ be the join attributes (i.e., those that are mentioned in two or more relations in the join expression). To start, an ordering of the attributes may be selected. This order determines the order of processing in the leapfrog tree-join. Different orders will lead to different running times based on the distribution of data in the component tables. A query optimizer chooses an order that minimizes the expected cost according to a cost model of the join operation, as well as the cost of building any required indexes that do not already exist. For simplicity of exposition, and without loss of generality, suppose that the chosen ordering is Ord=<$A_1, \ldots, A_k$>.

In some embodiments, the leapfrog tree-join algorithm assumes that for each participating relation R, there exists an index on the combination of join attributes from R, in an order consistent with Ord. For the query Q above, and with an ordering A,B,C of join attributes, indexes on (A,B) for R, (B,C) for S, and (A,C) for T may be expected. If such indexes do not exist in advance of the join, the indexes may be built to apply the leapfrog tree-join algorithm. To improve locality of access, the non-join attributes required for the query can also be included as indexed attributes after the join attributes. By including the non-join attributes in this way, index-only plans are enabled. In some embodiments, if the index needs to be stored on secondary storage, it would be allocated so that the leaf nodes are stored in order in a near-contiguous fashion.

In some embodiments, the leapfrog tree-join begins by joining tables on the first join attribute $A_1$ in the order. All tables that include $A_1$ among their attributes participate in a coordinated cursor-join on $A_1$. The scope for this initial cursor-join is the empty scope denoted [ ]. As each value, $a_1$, for $A_1$ is generated by the cursor-join, execution of the outer $A_1$ join is suspended, and an inner cursor-join on $A_2$ is initiated among all tables that include $A_2$, with scope [$A_1$=$a_1$]. For tables in this inner join that also include $A_1$, the scope [$A_1$=$a_1$] limits the inner join to just the $a_1$-fragment of the participating relations. Because an index is present on each relation in the <$A_1, \ldots, A_k$> order, the cursor-joins can proceed sequentially through each index at each level, and do not need to re-identify the starting cursor on each invocation.

In some embodiments, the remainder of the join proceeds recursively in a similar fashion to the above. When a value $a_j$ for $A_j$ is generated, execution suspends and an inner cursor-join on $A_{j+1}$ is initiated with a scope extended by $A_j$=$a_j$. At the final level, $A_k$, output tuples of the form ($a_1, \ldots, a_k$) are generated by the cursor join, including all join attributes required by the query. The final level output is the output of the leapfrog tree-join. After each cursor-join on $A_{j+1}$ is completed, control returns to the cursor-join on $A_j$ where the next matching value for attribute Aj is identified and a new cursor-join on $A_{j+1}$ is initiated. The algorithm completes once the last matching value for A1 has been processed and the outermost cursor-join is finished.

An order Ord=<$A_1, \ldots, A_k$> for the join attributes in a leapfrog tree-join is called prefix-coherent if it has the following property: for every table participating in the join, the join attributes in that table form a prefix <$A_1, \ldots, A_j$> of Ord, for some j≤k (different tables may have different values of j). For prefix-coherent configurations, embodiments of the leapfrog tree-join effectively perform an index-supported merge join of the participating tables without producing duplicate records. Processing benefits with respect to embodiments of the leapfrog tree-join described herein may be realized in cases that are not prefix-coherent. For example, joins such as R(A,B),S(B,C),T(A,C) do not have a prefix-coherent order of join attributes.

In some embodiments, the output of the leapfrog tree-join includes combinations of only the join attributes, without duplicates, and thus resembles a key-based join index. The following example describes the operation of leapfrog tree-join on a sample database.

Figure 1:
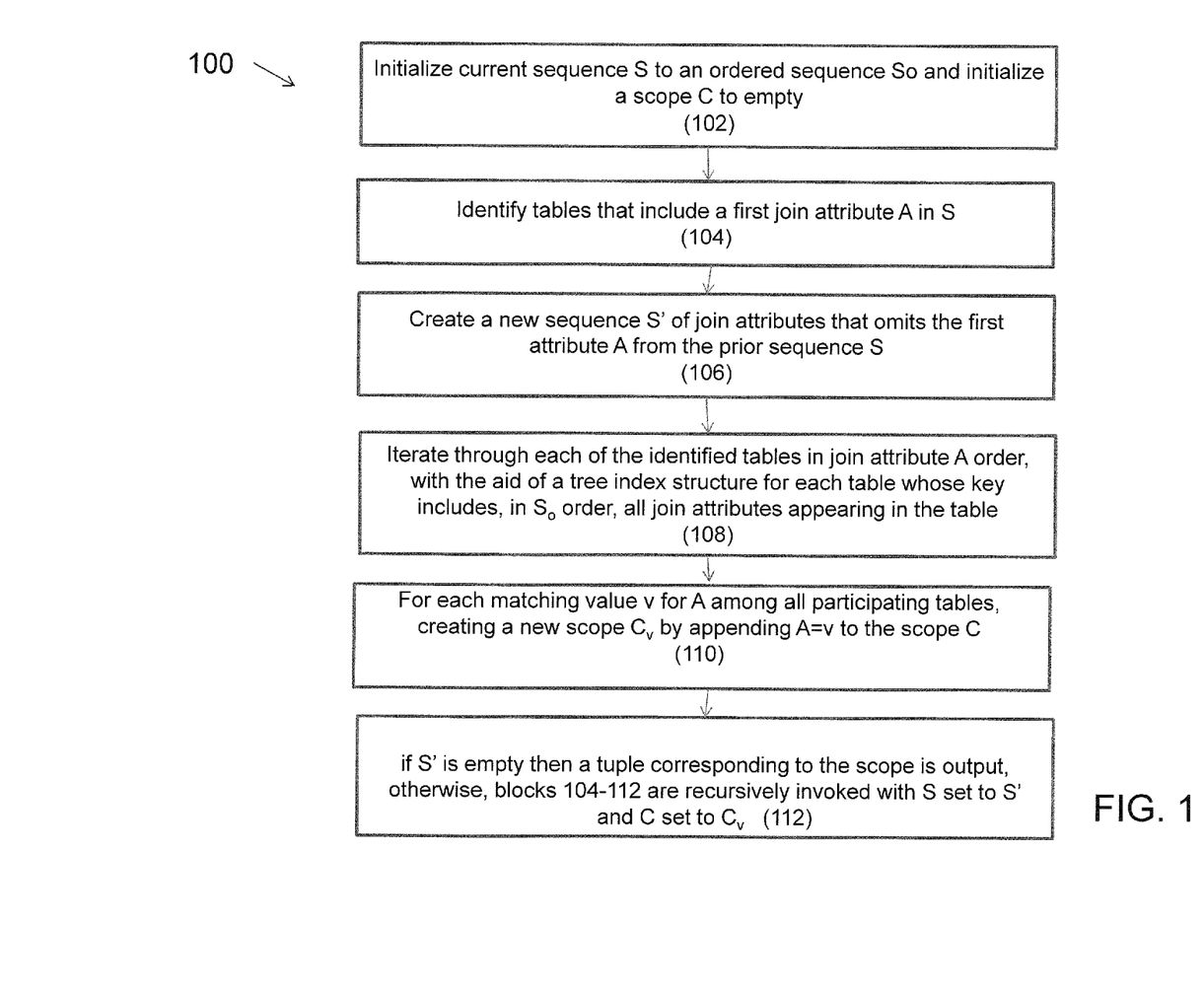
FIG. 1 depicts a flow chart of an exemplary method in accordance with an embodiment.

Referring to FIG. 1, a flow chart of an exemplary method 100 for performing a leapfrog tree-join is generally shown. The method 100 may be executed by one or more components, devices, or systems, such as those described herein. The method 100 may be used to join records from one or more database tables (e.g., at least three database tables) on a set S of join attributes.

In an illustrative example, a database represents orders placed by customers to an on-line retailer who represents many suppliers. The schema is as follows:

Customer(CId,State,Age) represents the identifier, state of residence, and age of the customer;

Supplies(SId,Product,State) represents the products shipped by suppliers from each state;

Orders(CId,SId,Product) represents customers' orders of products from suppliers; and Metallic(Product) indicates whether a product contains a significant metal component.

The following tables represent records that may be stored in a database in connection with this example.

TABLE 1

CUSTOMER RECORDS
Customer

| CId | State | Age |
|---|---|---|
| Alice | GA | 24 |
| Bob | MA | 24 |
| Fred | GA | 45 |
| Joe | GA | 37 |

TABLE 2

SUPPLIES RECORDS
Supplies

| SId | Product | State |
|---|---|---|
| Acme | Hammer | GA |
| Acme | Nails | GA |
| Acme | Tacks | GA |
| Acme | Tape | MA |
| Goodstore | Tacks | NY |

TABLE 3

METALLIC RECORDS
Metallic
Product

| Hammer |
| Nails |
| Tacks |

TABLE 4

ORDERS RECORDS
Orders

| CId | SId | Product |
|---|---|---|
| Alice | Acme | Hammer |
| Bob | Goodstore | Tacks |
| Joe | Acme | Hammer |
| Joe | Acme | Tacks |
| Joe | Acme | Tape |

In this example, the SQL query:

Select CId, SId, Product, State
From Customer C, Supplies S, Orders O, Metallic M
Where C.CId=O.CId and C.State=S.State and O.SId=S.Sid
and O.Product=S.Product and O.Product=M.Product seeks to identify customers who ordered metallic products that will be shipped within the same state.

At block 102, the set S of join attributes is initialized to an ordered sequence $S_0$. In the current example, the leapfrog tree-join chooses an ordering, or sequence $S_0$, of <CId,SId, Product,State> for the join attributes. In this example, sequence $S_0$ is a non-prefix-coherent ordered sequence. In an embodiment, sequence $S_0$ may be an alphabetical ordering of the attributes. In an embodiment, a query optimizer chooses the order of the sequence $S_0$.

At block 103, a scope C is initialized to the empty scope.

At block 104, tables that include a first join attribute, A, in S are identified. Referring to the current example, indexes on (CId,State) for Customer, on (SId,Product,State) for Supplies, on (Product) for Metallic, and (CId,SId,Product) for Orders are assumed. Tables that include the first join attribute, CId include the Customer and Orders tables.

At block 106, a new sequence S' of join attributes is determined that omits the first attribute A (e.g., CId) from the prior sequence $S_0$. Referring to the example, the new sequence S' is <SId, Product, State>.

At block 108, an iteration is performed in a coordinated fashion through each of the identified tables in join attribute A order, with the aid of a tree index structure for each table whose key includes, in $S_0$ order, all join attributes appearing in the table. In the example, the coordinated iteration is through Customer and Orders in CId order. The first match is CId=Alice.

At step 110, a second level recursive cursor-join on SId between Orders and Suppliers is initiated with scope [CId=Alice]. The first (and only) match for this scope has SId=Acme, leading to a third level recursive cursor-join on Product with scope [CId=Alice,SId=Acme].

Three tables, Orders, Suppliers, and Metallic participate in this third level cursor-join. Again, there is one match, with Product=Hammer. A fourth level cursor-join on State is initiated with scope [CId=Alice,SId=Acme,Product=Hammer]. The fourth level cursor join has one match with State=GA, leading to an output of the tuple (Alice,Acme,Hammer,GA) as described in step 110 because there are no remaining join attributes, i.e., S' is empty. With the fourth, third, and second level cursor joins complete, the algorithm may move to the next CId, Bob, in the first level cursor-join result.

Processing continues in this manner, as described in block 110, where for each matching value v for A among all participating tables, if S' is empty then a tuple corresponding to the matching values identified in each of recursive instances of block 110 may be output. Otherwise, blocks 104-110 may be recursively invoked with S set to S' and the scope extended based on the matching value for a join attribute.

Referring back to the example, once processing is complete for Alice, an analogous process (e.g. as shown in blocks 104-110) is performed for Bob, except that in this example the fourth level cursor join fails to find a match, since Bob's state of MA does not match the state (NY) of the Goodstore Tacks he ordered. The algorithm moves to the next CId Joe in the result of the top level cursor-join. It may be noted that Fred is skipped; even though Fred is present in the Customer table, Fred has not placed any orders.

The second level cursor join for [CId=Joe] identifies one match with SId=Acme. Even though there are three matching rows, there is only one matching SId because all three rows share the same SId. A third level cursor join is initiated with scope [CId=Joe,SId=Acme]. This join has two matches, leading to two separate fourth level cursor-joins with respective scopes [CId=Joe,SId=Acme,Product=Tacks] and [CId=Joe, SId=Acme,Product=Hammer]. (Even though Joe ordered Tape, Product=Tape is not in the third level cursor-join result because Tape is not metallic). Both scopes lead to matches in the fourth level cursor-joins, and corresponding output tuples (Joe,Acme,Tacks,GA) and (Joe,Acme,Hammer,GA). Control returns to the top level cursor-join, which completes and ends the execution of the leapfrog tree-join.

In some embodiments the generated set of tuples of join attribute values may be traversed. For each tuple T of join attribute values, at least one of the joined tables may be consulted to determine additional selected non-join attribute values from records matching T on the join attributes. In the example, suppose the attribute "Age" was additionally included in the Select clause of the SQL query. An index on (CId,State) over the Customer table could be used to find the Customer records corresponding to (CId,State) pairs in the join result and retrieve the Age values. All concatenations of T with selected non-join attribute values may be output from a record in each of the consulted tables.

In some embodiments, a filtering condition may be applied in connection with the method 100. For example, as part of block 108, rows that violate a filtering condition may be ignored. A filtering condition on a join attribute can be applied as soon as that join attribute value has been read. A value that does not meet the condition is simply skipped. Filtering conditions on non-join attributes can also be incorporated in one of several embodiments.

To illustrate filtering of a non-join attribute, suppose the example query was modified so that the additional condition "Age>25" was included in the Where clause of the SQL query. One embodiment for filtering is to compute the entire join result, including the Age attribute as above, and eliminate records violating the condition on Age as a final step.

Another embodiment uses the index on (CId,State) over the Customer table at an earlier stage of the algorithm to retrieve the Age values from the Customer table. Under a different order <CId,State,Product,SId> for the join attributes, retrieving the Age could be done after the second level cursor-join and (CId,State) pairs that don't have a qualifying Age value could be skipped at that stage, before progressing to the third-level cursor-join.

Another embodiment uses an extended index structure. In the example, suppose that instead of an index on (CId,State) the system had an index on (CId,State,Age) over the Customer table. The (CId,State,Age) index could be traversed in such a way that the Age values are also consulted, and only records with an Age in the filtered range proceed to the next step in the join algorithm.

In some embodiments, tree indexes are structured as B-trees.

In some embodiments, tree indexes are structured as tries.

If tables have different attribute names that are equated in a join, the equated attributes are considered to be equivalent, and one of the names is arbitrarily chosen when defining scopes, attribute orders, and other algorithmic steps.

Embodiments of the leapfrog tree-join may have the same worst-case optimality bounds as other joins within a logarithmic factor. The logarithmic factor is due to the traversal of tree indexes rather than direct lookups via hash indexes. In practice, the upper levels of the tree have a relatively small memory footprint, and may be cached in faster memory (e.g., random access memory or "RAM"), while the leaves and base tables may be stored in slower memory (e.g., magnetic disk). As a result, the extra steps for traversing the tree may not have a significant performance overhead.

In a number of examples, the leapfrog tree-join performs significantly better than the existing, or contemporary, join methods and techniques. To highlight this comparison, a critical step of contemporary join algorithms is outlined. When a contemporary join algorithm combines data from two relations (or sub-join results) R and S it considers fragments of R and S one at a time. For example, suppose an existing join algorithm is combining S(B,C) with T(A,C) based on C, and that a prior step has generated the set V of possible qualifying (A,B) values. For each (a,b) pair in V, the fragment $F_{S,b}$ of S with B=b is joined with the fragment $F_{T,a}$ of T with A=a. If $F_{S,b}$ is smaller than $F_{T,a}$, then values in $F_{S,b}$ are used to probe a hash index on $F_{T,a}$. Conversely, if $F_{T,a}$ is smaller than $F_{S,b}$, then values in $F_{T,a}$ are used to probe a hash index on $F_{S,b}$. In this way, the work done is proportional to the size of the smaller fragment.

The corresponding step of an embodiment of the leapfrog tree-join would combine $F_{S,b}$ and $F_{T,a}$ using a cursor-join. Consider, for example, a case where the C values in $F_{S,b}$ are $\{-km, -(k-1)m, \ldots, -m, 1, 2, \ldots, k\}$ and the C values in $F_{T,a}$ are $\{-k,-(k-1), \ldots, -1, m, 2m, \ldots, km\}$ for some integers k and m. The size of each input is 2 k, and contemporary join algorithms will perform 2 k hash index lookups. The actual join result contains $2\lfloor k/m \rfloor$ results where $\lfloor x \rfloor$ is the integer part of x. The number of times that the cursor-join will seek is proportional to $2\lfloor k/m \rfloor$, leading to an O(m/log(m)) factor improvement over the existing join algorithms. The log(m) factor is the cost of skipping O(m) elements using the tree index.

Another advantage of the leapfrog tree-join is that it can be extended in a straightforward way to handle band joins. An example of a band join condition on tables R and S would be "R.A-$c_1$≤S.A≤R.A+$c_2$" for some constants $c_1$ and $c_2$. Because records are indexed in join attribute order, matches will be localized to bands that can be cached in fast memory during the corresponding cursor-join. Algorithms that use hash indexes cannot localize matches in this way.

For some queries, additional attributes beyond the join attributes are required. In some embodiments, the leapfrog tree-join can be extended so that one or more of the non-join attributes are retrieved during a cursor-join step. This retrieval is efficient if it can be supported by a suitable index, such as an index that includes the join attributes and the needed non-join attributes. When a filtering condition limits values of a non-join attribute $R_i.B$, that filter can be applied as soon as $R_i.B$ is retrieved to filter out rows and reduce work for the remainder of the leapfrog tree-join.

Retrieved non-join attributes may optionally be recorded in the scope so that they can be output alongside the join attributes. However, including non-join attributes within the leapfrog tree-join can increase the complexity of the algorithm. In the following example, a join attribute value appears many times in an input relation (with different non-join attribute values) and the bookkeeping required to keep track of these non-join attributes within the leapfrog tree-join is significant. This bookkeeping is wasteful because a later stage of the leapfrog tree-join eliminates the join attribute value from the result.

As an illustrative example, a join R(A,B,D),S(B,C),T(A,C) with a non-join attribute D is considered. It may be assumed that table R contains n records of the form (1,1,i) for i=1, . . . , n; that table S contains a single record (1,2); and that table T contains the single record (1,1). It may be assumed that the order chosen for the leapfrog tree-join is <A,B,C> and that D is included in the scope for intermediate cursor-joins whose scope also includes A and B. The first cursor-join between R and T on A generates one scope record of the form [A=1]. At the second level, the algorithm generates n scope records of the form [A=1,B=1,D=i], with work proportional to n. At the final level, the cursor joins on C are all empty, leading to an empty output result. Had D been omitted from the scope, the work done would not have been proportional to n.

Since including non-join attributes within the leapfrog tree-join may be inefficient, the algorithm can defer retrieval of the non-join attributes until after the leapfrog tree-join is complete. The output of the leapfrog tree-join can be used in conjunction with indexes on the join attributes of each table to retrieve additional non-join attributes.

It is also possible to reduce the algorithmic effort by applying filtering conditions before the join. Consider the query $Q'=\sigma_{D>50}(R(A,B),S(B,C),T(A,C,D))$. If a tree index on D is available for T, then the condition D>50 identifies a subset, T', of rows from T that qualify. Even without an index, T' can be constructed by scanning all of T. T' can be sorted and indexed on (A,C) for a subsequent leapfrog tree-join. If the condition is sufficiently selective, then the effort of filtering in advance may be offset by the reduced join effort.

In an embodiment, choosing a suitable attribute order is performed by the query optimizer, a database system component that is well known in the art. The attribute order determines the order of the cursor-join steps within the leapfrog tree-join. In conventional relational databases, choosing a join order is a complex problem and several heuristic algorithms have been proposed. Statistics describing the database tables are stored and maintained. These statistics are used to estimate the cardinality of the intermediate results, so that unnecessarily large intermediate results can be avoided. The leapfrog tree-join ordering problem is analogous to that for conventional databases, and similar heuristics can be used to estimate the processing cost under various orderings.

In a complex query, the leapfrog tree-join can be used to compute the join of all participating tables. Alternatively, the leapfrog tree-join can be applied to a subset of the tables, and other algorithms used to combine the result with the remaining tables. A single query could be evaluated using multiple leapfrog tree-joins, each applied to disjoint subsets of the participating tables and/or intermediate results. The output of a leapfrog tree-join in an embodiment is in <$A_1, \ldots, A_k$> order, a property that may be exploited by subsequent join or aggregation operators.

Variations on the leapfrog tree-join can be used to compute operations besides equijoins. The cursor-join of n tables can be generalized to generate unions (over an attribute A) of its inputs by simply including attribute values of A that appear in any input. Other operations such as set difference and "j out of n matches" (1≤j≤n) can be implemented with only a slight increase in complexity.

In some embodiments, one or more methods are embodied in a set of instructions for one or more processors having access to one or more types of memory. The instructions could be coded in hardware or in software. Many kinds of platforms may be used, including but not limited to: computers, mobile telephones, tablet devices, game consoles, network management devices, field-programmable gate arrays, and cloud-based computer systems. Aspects of the disclosure could be deployed on multiple devices for concurrent operation. Embodiments may be used as a component of a larger system such as a database management system.

Figure 2:
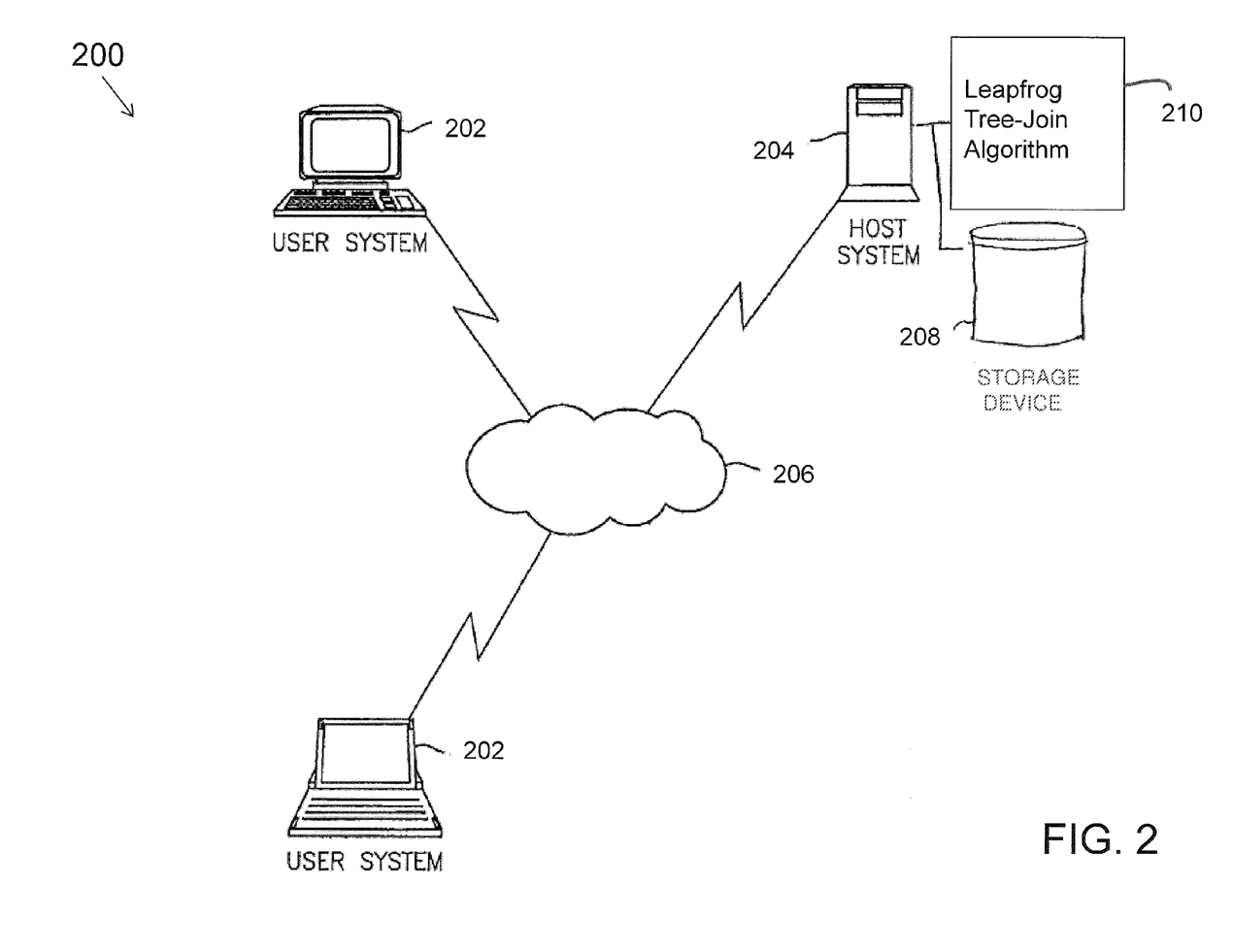
FIG. 2 depicts a block diagram of a system upon which leapfrog tree-joins may be implemented in accordance with an embodiment.

Referring to FIG. 2, a block diagram of an exemplary system 200 for automatically computing a join of multiple tables at once is generally shown. The system 200 includes a leapfrog tree-join algorithm 210 that is executed by one or more computer programs located on a host system 204. In an embodiment, all or a portion of the leapfrog tree-join algorithm 210 is part of a database management system executing on the host system 204. In another embodiment, all or a portion of the leapfrog tree-join algorithm 210 is a component of a system that supports both transactions and queries.

The system 200 depicted in FIG. 2 includes one or more user systems 202 through which users (e.g., end users, database administrators) at one or more geographic locations may contact the host system 204 to initiate programs that execute database queries and/or transactions. The user systems 202 are coupled to the host system 204 via a network 206. Each user system 202 may be implemented using a general-purpose computer executing a computer program for carrying out the processes described herein. The user systems 202 may be personal computers (e.g., a lap top, a tablet computer, a cellular telephone) or host attached terminals. If the user systems 202 are personal computers, the processing described herein may be shared by a user system 202 and the host system 204. The user systems 202 may also include game consoles, network management devices, and field programmable gate arrays. In addition, multiple user systems 202 and/or host systems 204 may be concurrently operating to perform a leapfrog tree-join.

The network 206 may be any type of known network including, but not limited to, a wide area network (WAN), a local area network (LAN), a global network (e.g. Internet), a virtual private network (VPN), a cloud network, and an intranet. The network 206 may be implemented using a wireless network or any kind of physical network implementation known in the art. A user system 202 may be coupled to the host system through multiple networks (e.g., cellular and Internet) so that not all user systems 202 are coupled to the host system 204 through the same network. One or more of the user systems 202 and the host system 204 may be connected to the network 206 in a wireless fashion. In one embodiment, the network is the Internet and one or more user systems 202 execute a user interface application (e.g. a web browser) to contact the host system 204 through the network 206. In another exemplary embodiment, the user system 202 is connected directly (i.e., not through the network 206) to the host system 204. In a further embodiment, the host system 204 is connected directly to or contains the storage device 208.

The storage device 208 includes data relating to computing a join of multiple tables at once and may be implemented using a variety of devices for storing electronic information. In an embodiment, data stored in the storage device 208 includes, but is not limited to, one or more databases, database tables, tree indexes, and other data utilized by embodiments described herein. It is understood that the storage device 208 may be implemented using memory contained in the host system 204 or that it may be a separate physical device. The storage device 208 may be logically addressable as a consolidated data source across a distributed environment that includes the network 206. Information stored in the storage device 208 may be retrieved and manipulated via the host system 204 and/or via a user system 202.

The host system 204 depicted in FIG. 2 may be implemented using one or more servers operating in response to a computer program stored in a storage medium accessible by the server. The host system 204 may operate as a network server (e.g., a web server) to communicate with the user system 202. The host system 204 handles sending and receiving information to and from the user system 202 and can perform associated tasks. The host system 204 may also include a firewall to prevent unauthorized access to the host system 204 and enforce any limitations on authorized access. For instance, an administrator may have access to the entire system and have authority to modify portions of the system. A firewall may be implemented using conventional hardware and/or software as is known in the art.

The host system 204 may also operate as an application server. The host system 204 executes one or more computer programs, including a leapfrog tree-join algorithm 210, to provide aspects of embodiments as described herein. Processing may be shared by the user system 202 and the host system 204 by providing an application to the user system 202. Alternatively, the user system 202 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A method to join records from a set of at least three tables in a database according to a set of join conditions on a set S of join attributes, the method comprising:

arranging the join attributes S into an ordered sequence $S_0$;

initializing a scope C to empty;

identifying tables in the set of tables that include a join attribute A that is first in the ordered sequence $S_0$;

creating a new sequence S' of join attributes that omits the join attribute A from $S_0$;

iterating through each of the identified tables in join attribute A order, the iterating based on a tree index structure for each of the identified tables where the index key includes all join attributes in the identified table in $S_0$ order;

for each matched value v of the join attribute located during the iterating, creating a new scope $C_v$ by appending "A=v" to the scope C;

determining whether S' is empty;

based on determining that S' is empty, outputting a tuple corresponding to the scope $C_v$ for each v; and based on determining that S' is not empty, setting $S_0$ to S' and for each scope $C_v$, setting C to $C_v$ and recursively invoking the identifying, creating, iterating, appending, determining, outputting and recursively invoking.

2. The method of claim 1, wherein the ordered sequence $S_0$ is a non-prefix-coherent ordered sequence.

3. The method of claim 1, wherein rows in the database tables that meet a filtering condition are skipped by the iterating.

4. The method of claim 1, further comprising building a tree index structure

5. The method of claim 1, wherein the tree index structure is a B-tree structure.

6. The method of claim 1, wherein the tree index structure is a trie structure.

7. The method of claim 1, wherein a non-join attribute value from a database table is output along with the tuple.

8. The method of claim 1, wherein a query optimizer is utilized to determine the ordered sequence.

9. A system for joining records from a set of at least three tables in a database according to a set of join conditions on a set S of join attributes, the system comprising:

a memory having computer readable computer instructions; and a processor for executing the computer readable instructions to perform a method comprising:

arranging the join attributes S into an ordered sequence $S_0$;

initializing a scope C to empty;

identifying tables in the set of tables that include a join attribute A that is first in the ordered sequence $S_0$;

creating a new sequence S' of join attributes that omits the join attribute A from $S_0$;

iterating through each of the identified tables in join attribute A order, the iterating based on a tree index structure for each of the identified tables where the index key includes all join attributes in the identified table in $S_0$ order;

for each matched value v of the join attribute located during the iterating, creating a new scope $C_v$ by appending "A=v" to the scope C;

determining whether S' is empty;

based on determining that S' is empty, outputting a tuple corresponding to the scope $C_v$ for each v; and based on determining that S' is not empty, setting $S_0$ to S' and for each scope $C_v$, setting C to $C_v$ and recursively invoking the identifying, creating, iterating, appending, determining, outputting and recursively invoking.

10. The system of claim 9, wherein the ordered sequence $S_0$ is a non-prefix-coherent ordered sequence.

11. The system of claim 9, wherein rows in the database tables that meet a filtering condition are skipped by the iterating.

12. The system of claim 9, wherein the method further comprises building a tree index structure 13. The system of claim 9, wherein the tree index structure is a B-tree structure.

14. The system of claim 9, wherein the tree index structure is a trie structure.

15. The system of claim 9, wherein a non-join attribute value from a database table is output along with the tuple.

16. The system of claim 9, wherein a query optimizer is utilized to determine the ordered sequence.

17. A computer program product for system for joining records from a set of at least three tables in a database according to a set of join conditions on a set S of join attributes, the computer program product comprising:

a computer readable storage medium having computer-readable program code embodied thereon, which when executed by a computer processor, causes the computer processor to implement a method, the method comprising:

arranging the join attributes S into an ordered sequence $S_0$;

initializing a scope C to empty;

identifying tables in the set of tables that include a join attribute A that is first in the ordered sequence $S_0$;

creating a new sequence S' of join attributes that omits the join attribute A from $S_0$;

iterating through each of the identified tables in join attribute A order, the iterating based on a tree index structure for each of the identified tables where the index key includes all join attributes in the identified table in $S_0$ order;

for each matched value v of the join attribute located during the iterating, creating a new scope $C_v$ by appending "A=v" to the scope C;

determining whether S' is empty;

based on determining that S' is empty, outputting a tuple corresponding to the scope $C_v$ for each v; and based on determining that S' is not empty, setting $S_0$ to S' and for each scope $C_v$, setting C to $C_v$ and recursively invoking the identifying, creating, iterating, appending, determining, outputting and recursively invoking.

18. The computer program product of claim 17, wherein the ordered sequence $S_0$ is a non-prefix-coherent ordered sequence.

19. The computer program product of claim 17, wherein rows in the database tables that meet a filtering condition are skipped by the iterating.

20. The computer program product of claim 17, wherein the tree index structure is a trie structure.

21. The computer program product of claim 17, wherein a non-join attribute value from a database table is output along with the tuple.

22. The computer program product of claim 17, wherein a query optimizer is utilized to determine the ordered sequence.

* * * * *